United States Patent [19]

Kennedy et al.

[11] 4,276,394

[45] Jun. 30, 1981

[54] NOVEL TELECHELIC POLYMERS, BLOCK COPOLYMERS AND PROCESSES FOR THE PREPARATION THEREOF

[75] Inventors: Joseph P. Kennedy; Robert A. Smith; Louis R. Ross, Jr., all of Akron, Ohio

[73] Assignee: The University of Akron, Akron, Ohio

[21] Appl. No.: 73,790

[22] Filed: Sep. 10, 1979

[51] Int. Cl.$^3$ .......................... C08F 4/14; C08F 4/16; C08F 10/10; C08F 293/00
[52] U.S. Cl. ................................ 525/245; 525/244; 525/249; 525/251; 525/319; 526/144; 526/206; 526/221; 526/237; 526/348.7
[58] Field of Search ............ 525/244, 245, 249, 251, 525/319; 526/144, 206, 221, 237, 348.7

[56] References Cited

U.S. PATENT DOCUMENTS

| | | | |
|---|---|---|---|
| 3,562,804 | 2/1971 | Powers | 526/237 |
| 3,694,377 | 9/1972 | Kennedy et al. | 526/348.7 |
| 3,994,993 | 11/1976 | Kennedy et al. | 525/249 |

*Primary Examiner*—Stanford M. Levin
*Attorney, Agent, or Firm*—Oldham, Oldham, Hudak & Weber Co.

[57] ABSTRACT

Novel telechelic halogenated polymers of cationically polymerizable olefin monomers are formed carrying from 2 to about 6 terminal halogens. The telechelic halogenated polymers are formed by reacting the monomer with an initiator transfer agent, carrying at least two tertiary halogens, and under cationic polymerization conditions. Additionally, novel thermoplastic elastomer block copolymers are formed from these telechelic halogenated polymers by reacting the latter with vinyl aromatic monomers in the presence of a coinitiator.

25 Claims, 4 Drawing Figures

FIG.3 chemical shift ($\delta$ ppm)

NOVEL TELECHELIC POLYMERS, BLOCK COPOLYMERS AND PROCESSES FOR THE PREPARATION THEREOF

TECHNICAL FIELD

The present invention is directed toward a process for the synthesis of novel telechelic, or terminally functional polymers such as terminally chlorinated polyisobutylenes. The compositions are further utilized in the synthesis of novel triblock copolymers and other compositions. To practice the process of the present invention a multifunctional compound capable of simultaneously initiating polymerization and acting as a transfer agent is employed. For this compound we have chosen the term inifer, derived from the words initiator and transfer, which term shall appear throughout the specification and claims.

Telechelic, or terminally functional linear polymers such as are prepared herein, are useful blocks for subsequent copolymerizations to form thermoplastics and thermoplastic elastomers. Telechelic star polymers arise when at least three polymer arms are linked to a common nucleus or center and each arm carries a functional terminus. When the arms comprise block copolymers of plastic and elastomeric segments, desirable thermoplastic elastomers are also obtained.

The advantages of thermoplastic elastomers lie in the fact that they have properties similar to vulcanized rubber, however, unlike the latter they will soften or melt when heated as is characteristic of thermoplastics. Therefore, reprocessing of scrap or unusable components is possible. Thermoplastic elastomers can undergo thermoplastic molding operations such as injection and blow molding; they are more readily extrudable than vulcanizable rubber; and they can be utilized in vacuum forming processes or as hot melt adhesives, neither of which is possible with conventional rubber.

BACKGROUND ART

Synthesis of thermoplastic elastomers has generally involved preparation of diblock copolymers having a rubbery segment and a plastic segment at least one of which remains nonterminated and reactive. Subsequently a di- or multifunctional compound is added to the non-terminated diblocks combining at least two of the blocks in a head-to-head orientation to produce a linear triblock composition. The product generally comprises a plastic segment connected to a rubbery segment which is, in turn, connected to a plastic segment. The plastic segment is usually a vinyl aromatic or A block, such as polystyrene, while the rubbery segment is usually a diene or B block, such as polybutadiene or polyisoprene; hence the abbreviation for the linear triblock is ABA.

Preparation via known synthesis of diblocks and the subsequent combining thereof involves anionic polymerization systems, generally organolithium initiated, to form ABLi diblocks which are linked together with a difunctional compound susceptible to lithiun ion attack such as diisocyanates, divinylbenzene, dibromoethane, epoxidized linseed oil or silicon tetrachloride. Examples of such processes are set forth in U.S. Pat. Nos. 3,639,517 and 3,639,521. When a polyfunctional linking compound is employed, such as silicon tetrachloride, a radial or branched structure results wherein four diblocks are linked together. By controlling the amount of selected difunctional linking compounds such as divinylbenzene or diisocynates, a multifunctional nucleus is developed which can also link together a plurality of ABLi diblocks. Such a process is set forth in U.S. Pat. Nos. 3,985,830 and 4,108,945.

While the technique is useful for anionically polymerizable monomers, resort to cationic mechanisms is required for monomers such as isobutylene. Unfortunately, it has not been possible heretofore to prepare thermoplastic elastomers comprising vinyl aromatics and isobutylene. Prior investigations of ours with other co-workers in the laboratories of our Assignee have demonstrated that certain unsaturated organic halides in combination with $BCl_3$ are effective initiating systems for isobutylene polymerization to form asymmetric telechelic polymers i.e., polyisobutylenes having an olefinic head and an alkyl halide end group. These investigations have been published and include: J. P. Kennedy, S. Y. Huang and S. C. Feinberg, J. Polymer Sci., Polymer Chem. Ed. 15, 2869 (1977); J. P. Kennedy, S. Y. Huang and R. A. Smith, Polymer Bulletin 1,000 (1979); and J. P. Kennedy, S. Y. Huang and R. A. Smith, J. Polymer Sci., Polymer Chem. Ed., (submitted). However, such polymers or B blocks have not successfully been incorporated in ABA triblock copolymers to date.

At least one U.S. patent of which we are aware, is directed toward a method of forming polyisobutylene U.S. Pat. having an unsaturated group at each end. That patent, No. 3,634,383, discloses the contacting of isobutylene with a 5 Å molecular sieve supposedly to extract a hydride ion from the monomer. Despite the claim that a product having two terminal double bonds thereby resulted, we are not aware that this work has ever been successfully duplicated and, in fact, the patentee has more recently stated that the polyisobutylene made by 5 Å molecular sieves contained less than two olefinic end groups, i.e., 1.70–1.32, per mole. These results have been published: S. L. Manatt, J. D. Ingham and J. A. Miller, Jr., Organic Magnetic Resoanance, 10, 198 (1977).

It has been our belief that asymmetric and symmetric telechelic polyisobutylenes could form the center or B block of various AB and ABA block copolymers. However, we are unaware of any process that would be commercially acceptable for the synthesis of telechelic polyisobutylene and we are equally unaware of the existence of such compositions as homopolymers or as incorporated in thermoplastic elastomer block copolymers. Nor, are we aware of any process for the synthesis of a polymer having at least three functionally terminated polyisobutylene arms or branches which could ultimately each carry an A block, giving rise to a thermoplastic elastomer block copolymer.

DISCLOSURE OF INVENTION

It is therefore an object of the present invention to provide a novel telechelic halogenated polymer formed from a cationically polymerizable olefin monomer having from about 4 to 12 carbon atoms and carrying at least two tertiary halogen termini.

It is a further object of the present invention to provide as a novel telechelic dihalogenated polymer, $\alpha,\omega$-di(t-chloro) polyisobutylene.

It is a further object of the present invention to provide as a novel telechelic trihalogenated polymer, tri(t-chloro)polyisobutylene tristar.

It is another object of the present invention to provide a process for the synthesis of a telechelic halogenated polyisobutylene that involves the use of an inifer, that is, a compound capable of simultaneously initiating polymerization and acting as a transfer agent.

It is yet another object of the present invention to provide a process for the synthesis of a telechelic halogenated polyisobutylene utilizing an inifer so as to avoid chain transfer to monomer after monomer initiation.

It is another object of the present invention to provide a novel, thermoplastic elastomer block copolymer comprising a central elastomer moiety, formed from a cationically polymerizable monomer having from about 4 to 12 carbon atoms, and having at least two ends each end carrying a glassy block polymer moiety formed from a vinyl aromatic monomer having from 8 to about 20 carbon atoms.

It is still another object of the present invention to provide a novel thermoplastic elastomer block copolymer that is saturated and therefore possesses superior oxidative stability and which contains a glassy component of high Tg thereby imparting superior thermal properties to the composition.

It is a further object of the present invention to provide as a novel thermoplastic elastomer block copolymer, poly(α-methylstyrene-b-isobutylene-b-α-methylstyrene).

It is further still an object of the present invention to provide a process for the synthesis of poly (α-methylstyrene-b-isobutylene-b-α-methylstyrene).

These and other objects, together with the advantages thereof over the prior art, which shall become apparent from the specification which follows, are accomplished by our invention as hereinafter described and claimed.

As used herein, telechelic is indicative of terminal functionality. The telechelic polymers and prepolymers of the present invention are prepared with inifers and have from 2 to about 6 polymer arms, each of which has polymerized from what will be described as the inifer residue and carries an identical functional terminus. The functional sites carried by the inifer are eventually carried by the telechelic polymer, a difunctional inifer giving rise to a telechelic difunctional polymer and a trifunctional inifer giving rise to a telechelic trifunctional polymer tristar. Insofar as the functionalities of the inifer are identical, the inifer and resulting polymer are symmetric and similarly, where the functionalities differ the inifer and polymer are asymmetric. The present invention is more specifically directed to work with symmetric inifers.

Inasmuch as the inifer residue is relatively small when compared to the number average molecular weight of each polymer arm, the latter ranging from about 500 to about 50,000, its presence can be disregarded for purposes of discussion herein. Therefore, the molecular weight of a linear polyisobutylene will range from 1,000 to 100,000 while that of a polyisobutylene tristar will range from 1,500 to 150,000.

In general, the process of the present invention for the synthesis of a telechelic polymer comprises the steps of charging isobutylene and an inifer to a suitable reaction vessel, adding a precooled solution of a coinitiator in methylene chloride, polymerizing the isobutylene and thereafter terminating the reaction and separating the terminally dichlorinated polyisobutylene from the unreacted components in the reaction vessel. The preferred inifer employed is p-di(2-chloro-2-propyl)benzene, also referred to as p-bis(α,α-dimethyl chloromethyl)benzene or p-di-(t-chloro)benzene and commonly known as p-dicumyl chloride and abbreviated pDCC. The composition resulting from this polymerization comprises a polyisobutylene chain having the inifer residue in the center. Practically, this polymer can also be thought of as a symmetrical dihalogenated polymer viz., α,ω-di(t-chloro)polyisobutylene.

In addition to preparation of dichloro polyisobutylenes, a further step in the process of the present invention provides for the synthesis of the thermoplastic elastomer poly(α-methylstyrene-b-isobutylene-b-α-methylstyrene). The latter synthesis requires adding the diterminally chlorinated polyisobutylene with cooling, thereafter adding α-methylstyrene and finally an initiator system including an alkylaluminum halide in dichloromethane, allowing the α-methylstyrene to polymerize from the polyisobutylene and thereafter terminating the reaction and separating the triblock copolymer from the unreacted components in the reaction vessel.

By selecting an inifer having more than two halogens such as 1,3,5-tris(α,α-dimethyl chloromethyl) benzene, also commonly referred to as tricumyl chloride and abbreviated TCC, it is possible to form a telechelic polymer structure having three halogen terminated arms or branches. From these functionalities a vinyl aromatic can be polymerized resulting in a polymer product having a central, elastomer moiety or B region, polyisobutylene, and an outer, glassy block polymer moiety or A region, polystyrene. Such structures can be thought of as tristar or radial block copolymers, Notwithstanding the star architecture, as opposed to the aforementioned linear, the more general structure of the polymer is that of a triblock ABA, the cross-section, thereof being, the outer glassy block polystyrene, the inner or central elastomer block polyisobutylene and the opposite side outer glassy block polystyrene. Such compositions would therefore be useful as thermoplastic elastomers.

Accordingly, if the inifer has more than three halogens, a polymer having as many arms will result. Generally the number of arms can range from 2 to about 6 and the polymer will be symmetric in that each arm will carry the same terminus. It is to be understood therefore, that the terminology thermoplastic elastomer block copolymer as appears in the specification and claims which follow, is applicable to both linear ABA and star ABA copolymers.

Similarly, the telechelic polymers of the present invention can be synthesized from monomers other than isobutylene according to the process disclosed herein. Suitable monomers are disclosed hereinbelow.

PREFERRED MODE FOR CARRYING OUT THE INVENTION

Figure 1:
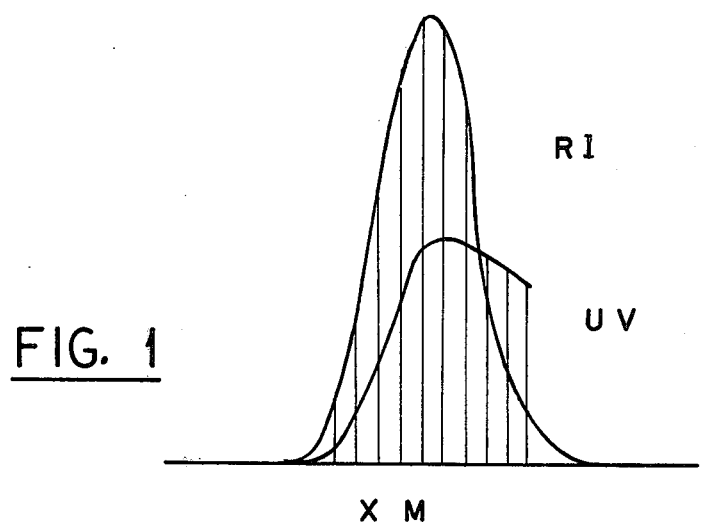
FIG. 1 depicts twin GPC traces of a symmetric terminally chlorinated product, α,ω-di(t-chloro)polyisobutylene, prepared by the process of the present invention; the upper trace indicating differential refractive index (RI) and the lower trace indicating ultraviolet absorption (UV)

Synthesis of diterminally halogenated polyisobutylenes is first set forth and is based on the use of a bifunctional compound, for which we have selected the term inifer as set forth hereinabove. The inifer, short for initiator-transfer agent, not only provides for the controlled initiation and propagation of the polymerization reaction, which many initiators do, but in addition can and does function effectively in the important step of chain transfer. Chain transfer agents are known and are utilized to receive available carbenium ions in exchange for ions, usually halide, that they carry. The rate of transfer to the chain transfer agent must be favored over the rate of transfer to the monomer in order for the chain transfer agent to be useful and the synthesis of telechelic polymer successful.

Initiation in carbocationic polymerizations can be visualized first to involve ion generation from an organohalide RX, and a Friedel-Crafts acid $MeX_n$, according to the reaction:

Ion generation:

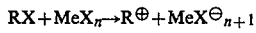
$RX + MeX_n \rightarrow R^\oplus + MeX^\ominus_{n+1}$

Next, cationation of the monomer occurs which, when controlled, leads to the formation of polymers with desired functional head groups as well as graft copolymers.

Cationation:

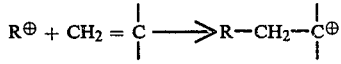

Undesirable chain transfer to monomer, or monomer transfer, occurs by elimination of β protons from carbocationic propagating species and by protonation of the monomer, as follows:

Chain transfer to monomer:

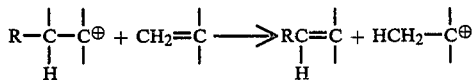

This event leads to an unsaturated end group and a methyl head group and is clearly unacceptable for the synthesis of biterminally functional telechelic polymers. Furthermore, monomer transfer is usually competitive with propagation and tends to reduce molecular weights. In order to minimize chain transfer to monomer, carbocationic polymerizations are often carried out at low temperatures.

As briefly stated hereinabove, a chain transfer agent is a compound, such as an organic halide, which will interchange its halide ion with a carbenium ion to form a new carbenium ion that is more stable than the halogen acceptor:

Chain transfer to organic halides:

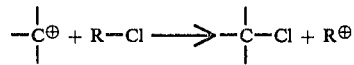

Chain transfer to organic halides yields a polymer with a halide end group and, provided the newly formed carbenium ion $R^\oplus$ continues the kinetic chain, a polymer with an R head group.

By employing a bifunctional inifer XRX, the following scheme has now been found to be possible with a cationically polymerizable monomer M:

Ion generation:

$XRX + MeX_n \rightarrow XR^\oplus + MeX^\ominus_{n+1}$

Cationation:

In view of the bifunctional nature of the inifer XRX, identical, simultaneous initiation and chain transfer to inifer will occur with the second functionality of XRX to yield as a final product, XM~MRM~MX which comprises two X-terminated polymers linked to the inifer residue R. For synthesis of this polymer, it is mandatory that the rate of chain transfer to monomer be negligible as compared to the rate of chain transfer to inifer. For well-defined perfectly telechelic linear functional polymers, that is, two functional groups per polymer product, it is desirable to avoid or minimize termination unless termination leads to the same end group as chain transfer to inifer. Thus, in the foregoing scheme, the ~MX end group may arise by chain transfer to inifer or termination and in either event it is unreactive toward excess Friedel-Crafts acid in the charge.

The preferred monomer employed in our work is isobutylene; the polymer polyisobutylene (PIB) being a useful center segment for subsequent syntheses particularly those in which thermoplastic elastomer linear triblock copolymers result. Number average molecular weight of the polyisobutylene segment can vary depending upon desired end use; however weights of from about 500 to about $5 \times 10^5$ are obtainable via the process of the present invention. In addition to isobutylene, other cationically polymerizable olefinic monomers having from 4 to about 12 carbon atoms per molecule such as β-pinene, 1-butene, 2-methyl-1-butene, 4-methyl-1-pentene, 3-methyl-1-butene, vinylcyclohexane, isobutyl vinyl ether, ethyl vinyl ether, methyl vinyl ether and the like can be utilized to yield telechelic polymers.

Regarding composition of the telechelic polymer, the bifunctional termini it carries are directly dependent upon the groups originally carried by the inifer. The preferred inifer therefor is p-dicumyl chloride pDCC which provides a tertiary chlorine on the terminal sites of the polymer and a phenyl group at the center. Thus, during synthesis, the halogen functionality of the inifer forms the end and head groups of the polymer yielding the following product:

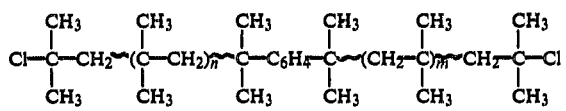

abbreviated by Cl-PIB-Cl herein.

In addition to p-dicumyl chloride, m-dicumyl chloride has also been found to be an effective inifer for the formation of telechelic polymers. These and other inifers that can be utilized for practice of the present invention have the general formula AY$_n$. The A component of the inifer can be an aromatic moiety, having 1 to about 4 phenyl rings either noncondensed such as phenyl, biphenyl or terphenyl, or condensed such as naphthalene, anthracene, phenanthrene or pyrene. The Y component is represented by the formula

wherein R and R' can be hydrogen, methyl or phenyl and R and R' can be the same and X is F, Cl or Br, and, n is an integer from 2 to 6. The aromatic carbons of A, not carrying Y can carry hydrogen and/or small alkyl groups having 1 to about 4 carbon atoms.

In addition to aromatic moieties, A can also be aliphatic such as a linear or branched chain having from 3 to about 20 carbon atoms. Although Y is again represented by the formula

wherein R and R' can be hydrogen, methyl or phenyl, there is here the exception that at least one of the groups must be phenyl, in order that the halogen, X be benzylic. The halogens X and number of Y groups n are the same as set forth hereinabove. The aliphatic carbons of A not carrying Y or alkyl branches will carry hydrogen.

A second class of inifers that can be employed are small hydrocarbon molecules having not more than about 15 to 20 carbon atoms which can be represented by the formula BZ. B is a functional group which survives cationic polymerization conditions by virtue of being of relatively low cationic activity. Three such groups would be vinyl, a hydrocarbon substituted with silane groups thereon, and dicyclopentadienes. Z can be a tertiary halogen, the halogen being F, Cl or Br. These halogens are able to initiate cationic polymerization in the presence of BCl$_3$ or an alkylaluminum halogen compound.

These inifers are asymmetric, as compared to those having the formula AY$_n$, and will give rise to a polymer such as polyisobutylene having a vinyl, a silane or a dicyclopentadienyl end group and a benzylic, tertiary or allylic halogen end group. In subsequent reactions, with these polymers, each group can be treated separately to yield products other than would be obtainable with the AY$_n$ inifers which can be considered to be symmetric inifers in the sense that all end groups of the polymer arms will carry the same terminus.

Other inifers which cannot be described by either formula include homopolymers of α-chlorstyrene and/or 2-chloropropene and copolymers thereof with other hydrocarbons. With respect to these monomers, an oligomer of 2 to 6 units is formed from which 2 to 6 polyisobutylene chains can be attached each terminated by the halogen X which can be F, Cl or Br.

It should therefore be appreciated that both symmetric and asymmetric compounds are included within the group of inifers disclosed herein and that the selection of either will depend upon the polymer product desired just as the number of halogen containing groups can vary from 2 to 6 and will, in turn, determine the number of polymer arms that will polymerize from the inifer.

The effect of inifer concentration is inversely proportional to the molecular weight of PIB as is discussed in greater detail hereinbelow. In general however, we have found a concentration of from about $10^{-4}$ moles to about $10^{-1}$ moles, per mole of isobutylene monomer will yield PIB of useful molecular weights.

The effect of temperature and various solvents are also discussed hereinbelow, however, for present purposes it can be said that the polymerization of isobutylene monomer with p-dicumyl chloride can be conducted at a temperature range of from about $-10°$ C. to about $-78°$ C. and in a polar solvent such as methylene chloride or solvent mixture. Polymerizations are conducted over a period of time ranging from about 1 minute to 1 hour with 10 minutes being preferred. In order for the inifer to initiate the polymerization, a solution of methylene chloride CH$_2$Cl$_2$ and a coinitiator such as boron trichloride BCl$_3$ is added to the reaction vessel. The inifer and BCl$_3$ solution thus form an initiator system. In lieu of BCl$_3$, other Friedel-Crafts acids such as SnCl$_4$, TiCl$_4$, SbCl$_6$, FeCl$_3$ and the like can be utilized.

EXPERIMENTAL PROCEDURE

Several polymerizations were conducted with the inifer p-dicumyl chloride involving varying concentrations of components and varying reaction conditions and the results thereof appear in Tables 1–5. The general procedure followed for each polymerization was as follows:

Isobutylene and methylene chloride were dried by passing the gas through BaO and molecular sieve (4Å) filled columns. Boron trichloride was distilled from lecture bottles. Methylene chloride was refluxed overnight under nitrogen in the presence of triethylaluminum and stored in brown septumcapped bottles. The solvent was freshly distilled prior to use. Tetrahydrofuran used in GPC analyses was dried over CaH$_2$ and distilled under nitrogen.

p-Bis(α,α-dimethyl chloromethyl)benzene, inifer, was prepared by hydrochlorinating p-diisopropenylbenzene in CH$_2$Cl$_2$ solvent at 0° and purified by freeze drying overnight. The p-diisopropenylbenzene was prepared from p-phenyldiacetal by the method of A. A. D'Onofrio, J. Appl. Polymer Sci. 8, 521 (1964). The p isomer was repeatedly recrystallized from ethanol and water.

All manipulations, polymerizations, transfers of chemicals, etc. were carried out in a stainless steel enclosure under nitrogen atmosphere. Polymerizations were conducted in baked out culture tubes equipped with teflon-lined screw caps. The tubes were charged with solvent, monomer, and 1,4-bis(α,α-dimethyl chloromethyl)benzene, and cooled to the desired temperature. Reactions were started by adding a precooled solution of BCl₃ in CH₂Cl₂ to the charges. The reactions were heterogeneous in all solvents and solvent mixtures. After desired times reactions were terminated by the addition of a few milliliters of prechilled methanol. Details of the equipment have been described by J. P. Kennedy J. Appl Polymer Sci., Appl. Polymer Symp. 30 (1977), to which reference can be made.

Gel permeation chromatography was performed using a Waters Associates 6000 Å High Pressure G.P.C. equipped with dual UV and RI (refractive index) detectors and Microstyragel columns of $10^6$, $10^5$, $10^4$, $10^3$ and 500 Å. Approximately 0.2 ml of 0.2% solutions of Cl-PIB-Cl in THF were used. A calibration curve was constructed using fractionated PIB samples of known molecular weight.

$H^1$ NMR analyses were carried out using a Varian Associates T-60 NMR spectrometer. Solutions of approximately 10% polymer, and 5% low molecular weight materials in CCl₄ or CDCl₃ were employed.

A 20:1 solvent/BCl₃ solution was prepared consisting of 20 parts of CH₂Cl₂ to 1 part BCl₃. 0.5 gms of p-dicumyl chloride crystals were dissolved in 11 ml of CH₂Cl₂ to yield a master inifer solution having a concentration of 0.25 M.

The reaction vessel (baked out culture tube) was charged with 16.4 ml CH₂Cl₂ and 1.6 ml of isobutylene and 1 ml of the inifer master solution (0.25 M) and cooled to the desired temperature ($-50°$ C.). Next, 1 ml of the solvent/BCl₃ solution was added to initiate the reaction. The solution in the vessel immediately turned cloudy. Large lumps of polymer were formed in 5 to 120 seconds and the reaction was terminated after about 10 minutes by the addition of several mls of methanol. The resultant polymer and that obtained from identical reactions, was recovered by evaporation of volatiles and employed in characterization studies to verify the structure and composition thereof, discussed hereinbelow.

Before proceeding to the verifications, the mechanism by which we believe the inifer process proceeds shall be discussed with reference to the following schematic:

Synthesis of Biterminally Chlorinated PIB

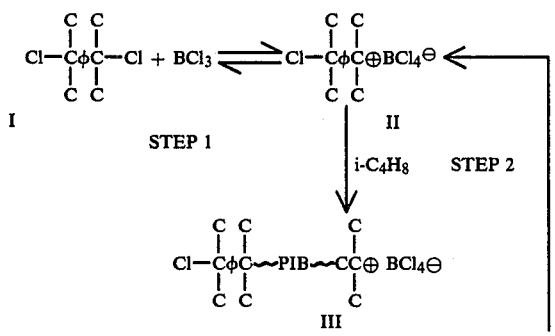

Synthesis of Biterminally Chlorinated PIB
—continued

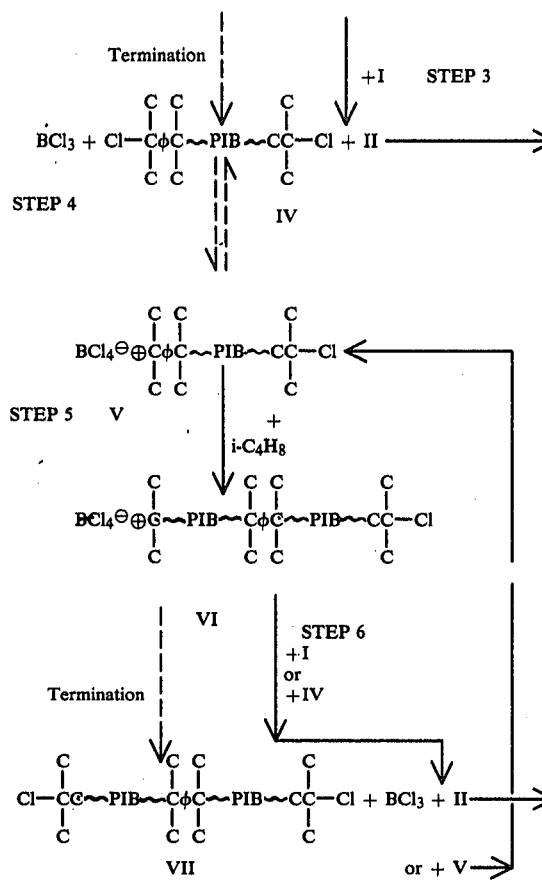

In the first step, ion generation between the inifer I and BCl₃ occurs yielding the ion pair II. In the second step cationation of the isobutylene occurs leading to the formation of a growing polyisobutylene chain III. In the third and critical step, chain transfer to the inifer I occurs yielding a tertiary-chloride terminated PIB polymer IV, BCl₃ and the ion pair II. The formation, consumption and re-formation of II represents an inifer loop as indicated by the arrows. Species IV contains a tertiary benzylic chlorine and a tertiary alkyl chlorine; of these only the former structure is ionizable by BCl₃ while the latter is inactive, even in the presence of excess BCl₃. In the fourth step, the tertiary benzylic chloride readily ionizes with BCl₃ and yields another ion pair V which in turn polymerizes isobutylene (step 5) and gives rise to a species containing an inactive tertiary chlorine-terminated chain and a growing PIB chain VI. In the sixth and next critical step, chain transfer from VI to I or IV occurs to yield the desired product, bifunctional PIB VII plus BCl₃ plus II or V, respectively. Inasmuch as both the inifer and species IV contain readily mobilizable tertiary benzylic chlorine, chain transfer to I and/or IV (steps 1 and 4) are expected to proceed very rapidly. Chain transfer with inifer I and species IV are parts of two additional inifer loops. The only stable endproduct of the three inifer loops is VII the desired Cl-PIB-Cl molecule.

The two broken arrows indicate irreversible termination steps i.e., the collapse of the PIB⊕BCl₄⊖ ion-pair. The frequency of these steps in comparison to those indicated by the solid arrows i.e., chain transfer to benzylic chlorines I, III or IV is low since high inifer efficiencies can readily be obtained as can be seen from the Tables hereinbelow.

Species III contains benzylic chlorine and may also function as chain transfer agent; in this case a dication would form and propagation may proceed simultaneously at both chain termini. In the final analysis all routes must lead to VII i.e., Cl-PIB-Cl.

What is important is that both termination and chain transfer to inifer (or benzylic halide, in general) gives rise to the same $BCl_3$-inactive $\sim CH_2C(CH_3)_2Cl$ terminus. The fact that both events lead to the same end group greatly simplifies the efficient synthesis of Cl-PIB-Cl. If termination and chain transfer to inifer were to lead to different end groups, conditions under which termination is minimized would be necessary e.g., under super-pure high-vacuum conditions.

The absence of chain transfer to monomer is mandatory. Each monomer transfer step would introduce two undesirable termini i.e., an unsaturated end group and a $CH_3$ head group. The greatest value of the inifer method resides in the possibility of overcoming chain transfer to monomer by preferential chain transfer to inifer. Thus the synthesis of diterminally functional, telechelic polymers, becomes readily achievable. Chain transfer to monomer does not occur in the pDCC/$BCl_3$/isobutylene/$CH_2Cl_2$/$-50°$ to $-78°$ system and the polymerization readily yields Cl-PIB-Cl.

Inasmuch as the telechelic Cl-PIB-Cl formed by the use of pDCC was expected to contain one p-substituted phenyl group in the interior of the chain, the quantitative demonstration of one phenyl group or Cl-PIB-Cl was of paramount importance for proving that the process operated as we believed and that the inifer did become incorporated in the polymer; the latter, in turn, carrying the t-chlorine termini. Additionally, the presence of the central phenyl group in the polymer is useful for product characterization. For example, quantitative determination of the phenyl ring by UV provides valuable data for the number of molecules present and, by relating to the number of end groups, molecular weights can be calculated.

Static UV methods were judged to be unsuitable for the analytical task due to the high sensitivity of such methods toward difficultly removable traces of pDCC impurities in the polymer. In contrast, dynamic UV measurements, readily accessible by GPC instrument equipped with UV and RI detectors, were found to provide the necessary data. Even large quantities of pDCC impurities can be easily separated from samples by fractionation through passage of micro Styragel columns. The rationale of the analytical method is first discussed and then a representative example is presented.

The GPC instrument produced twin UV and RI traces which appear in FIG. 1. Provided there is only one chromophore (phenyl group) per Cl-PIB-Cl chain, the height of the UV trace at any elution volume is directly proportional to the number of Cl-PIB-Cl chains in the sample thus, $UV = Kn$; similarly, the height of the RI trace at any elution volume is directly proportional to the concentration (weight fraction) of the sample as embodied in the following relationship: $RI = kc = k \cdot n \cdot MW$ where n = number of phenyl groups, c = concentration, MW = molecular weight. Thus, $UV/RI = kn/knMW = 1/MW$. Experimentally, the method consists of obtaining a suitably large number of $(UV/RI)_x$ values at various elution volumes x, i.e., at molecular weights $(MW)_x$, and selecting a reference $UV/RI_m$ at $(MW)_m$ and plotting $(UV/RI)_m/(UV/RI)_x$ values versus the corresponding array of $(MW)_x/(MW)_m$ values. To minimize error we chose the maximum of the RI trace as the reference point m because at this point the change in RI absorption with small changes in the elution volume is minimal.

Figure 2:
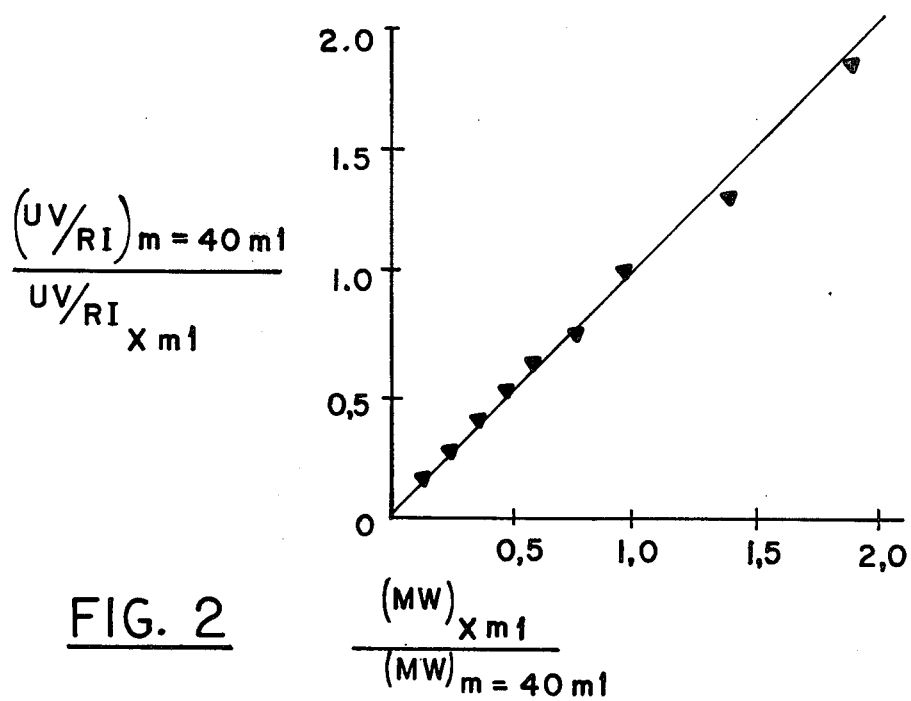
FIG. 2 is a graph wherein the relation UV/RI is plotted against MW for the difunctional polyisobutylene.

If there were one chromophore per Cl-PIB-Cl, a $(UV/RI)_m/(UV/RI)_x$ versus $(MW)_x/(MW)_m$ plot must yield a straight line with unity slope. Such UV/RI versus MW plots are very sensitive indicators for the presence of one $C_6H_4$ unit per Cl-PIB-Cl chain and have been used routinely in our research as a diagnostic method. FIG. 2 depicts a representative UV/RI versus MW plot. It is to be noted that the slope of UV/RI versus MW plots will be unity not only when n=1 but also when n remains the same for every polymer molecule in every fraction along the elution volume axis. Statistically, however, it is virtually impossible for this situation to arise.

As is seen from the data in Table 1 hereinbelow, under a variety of conditions only one phenyl group is incorporated per Cl-PIB-Cl molecule. As judged by the unit slope of UV/RI versus $\overline{M}n$ plots (FIG. 2), cumyl carbenium ions derived from pDCC are involved in initiation and chain transfer to inifer and are not involved in undesirable side-reactions. While UV/RI versus $\overline{M}n$ plots are very sensitive indicators for the presence of one aromatic nucleus per chain, they do not indicate the position of phenyl rings in the polymer. The possibility exists that only one of the two cumyl chlorines in pDCC is active in which instance asymmetrically telechelic polymers having different terminal reactivities would arise. According to $H^1$ NMR spectroscopy this is not the case and pDCC is an efficient inifer giving rise to biterminally symmetrical telechelic polymers.

Figure 3:
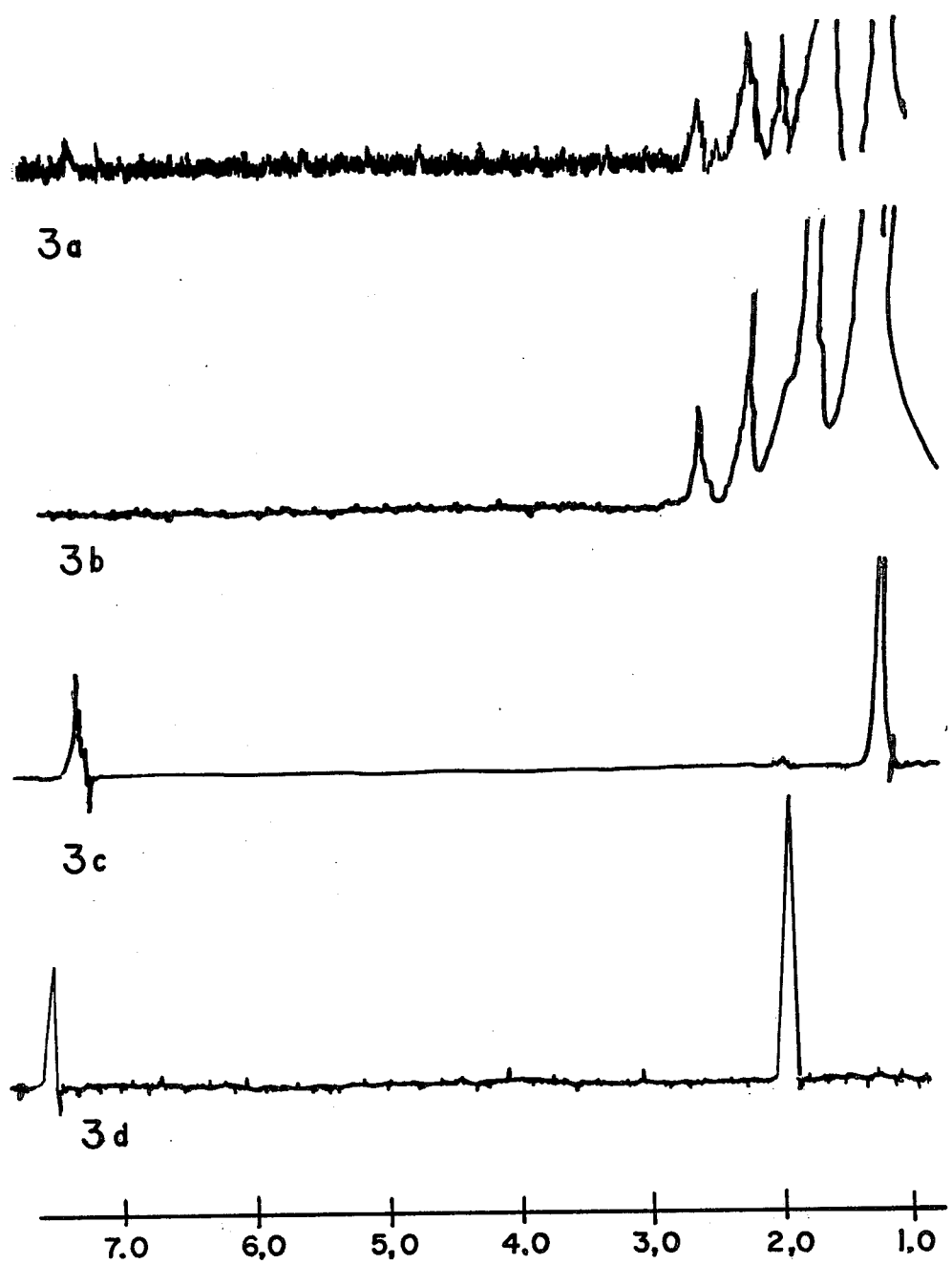
FIG. 3 depicts four $H^1$ NMR spectra in four separate traces, 3a–3d; trace 3a is the spectrum of the difunctional product; trace 3b is the spectrum of a model PIB containing one $—CH_2(CH_3)_2Cl$ terminus; trace 3c is the spectrum of (p-di-t-butylbenzene; and trace 3d is the spectrum of the inifer p-di(t-chloro)benzene; and, FIG. 4 is a stress-strain plot for a poly (α-methylstyrene-b-isobutylene-b-α-methstyrene) triblock copolymer of the present invention.

Analysis of aromatic protons and those in the vicinity of tertiary chlorine in Cl-PIB-Cl was next conducted to demonstrate the presence of a 1,4-dialkyl substituted phenyl group and the existance of terminal chlorines in PIB. Spectra 3a, 3b and 3c of FIG. 3 show, respectively, the $H^1$ NMR spectrum of a Cl-PIB-Cl obtained in the pDCC/$BCl_3$/i-$C_4H_8$/$CH_3Cl$/$-40°$ system, a model PIB containing one $-CH_2(CH_3)_2Cl$ terminus, and for comparison p-di(t-butylbenzene).

Efforts were made to synthesize low molecular weight polymers to facilitate $H^1$ NMR analysis. Preliminary studies showed that low molecular weight PIB ($\overline{M}n = 600-900$) can be obtained by the use of $H_2O$/$BCl_3$ in $CH_3Cl$ at $-40°$. The model polymer whose spectrum is shown in spectrum 3b has been produced under these conditions and exhibits readily analyzable sharp resonances. The two large resonances at about 1.0 and 2.0 ppm are associated with $-CH_3$ and $-C\underline{H}_2$, respectively. The smaller resonance at 1.65 ppm is due to protons of geminal methyl groups at the terminus neighboring a tertiary chlorine $\sim C(CH_3)_2Cl$. The same chemical shift is exhibited by the geminal methyl protons $\beta$ to the tertiary chlorine in a 2-chloro-2,4,4-trimethylpentane model compound and has been verified by work in the laboratories of the Assignee of record herein. The smallest resonance at $\sim 1.85$ ppm is due to methylene protons $\beta$ to the terminal tertiary chlorine $-CH_2-C(CH_3)_2Cl$. This chemical shift is identical to that associated with $\beta$-methylene protons in 2-chloro-2,4,4-trimethylpentane. These resonances at 1.65 and 1.85 ppm are viewed to be diagnostic proof for the presence of terminal tertiary chlorines in PIB.

Subsequently, low molecular weight PIB was obtained by polymerizing isobutylene in the presence of p DCC inifer using CH$_3$Cl at 40° C. The H$^1$ NMR spectrum of the product is shown in spectrum 3a. The molecular weight of the polymer was somewhat higher than expected yielding a spectrum somewhat less sharp than that of the model compounds. The presence of geminal methyl and methylene protons β to a tertiary chlorine ~CH$_2$C(CH$_3$)$_2$Cl in the spectrum 3a is indicated by comparison with spectra 3b and 3c. Resonances at 1.80 and 2.0 ppm are most likely due to alkyl protons in the paramagnetic environment of the vicinity of the aromatic ring (inifer residue) incorporated into the PIB chain. As can be seen from spectra 3c and 3d, the aromatic protons on a para disubstituted benzene ring are sensitive to the nature of the groups.

The chemical shift of the four equivalent aromatic protons in pDCC (7.60 ppm—spectrum 3d) is markedly downfield from the four equivalent aromatic protons in p-di(t-butyl)benzene (7.15 ppm—spectrum 3c). The difference may be exploited to determine if only one or both cumyl chlorines in pDCC is/are active during polymerization. Participation by both cumyl chlorines in the polymerization will produce a p-(t-alkyl) disubstituted aromatic ring and the aromatic proton resonance should occur at ~7.15 ppm. Participation of only one cumyl chloride will produce an aromatic ring containing p-t-alkyl and cumyl chloride groups. Although the corresponding model compound (e.g., p-(CH$_3$)$_3$C—C$_6$H$_4$—C(CH$_3$)$_2$Cl) could not be obtained, the resonances of the aromatic protons should be between 7.15 and 7.60 ppm (i.e., at ~7.40 ppm). The chemical shift of the aromatic protons in the polymer obtained in the presence of pDCC inifer occurs at 7.15 ppm indicating a p-di(t-alkyl) disubstituted aromatic ring which is only possible of both cumyl chlorines give rise to PIB chains. Thus according to H$^1$ NMR evidence the p-di(t-alkyl) phenyl group is located in the interior and not at the terminus of PIB chains, i.e., the polymer is symmetrically telechelic.

With respect now to the data in the Tables, subsequent polymerizations were conducted wherein temperature, solvent and concentration of inifer and isobutylene were varied.

Table 1 summarizes representative results of experiments in which BCl$_3$ (in CH$_2$Cl$_2$) solutions have been added to isobutylene-pDCC charges in various diluents in the 30° to 70° range. It will be noted that the number average molecular weight ($\overline{M}n$) of the difunctional polyisobutylene polymer varied greatly depending upon solvent temperature and concentrations. Highest molecular weight was observed for Example 4. Inifer efficiency (percent p-DCC incorporated into the polymer chain) is high, often approaching 100%. Most importantly, the slopes of the UV/RI versus $\overline{M}n$ curves are 1.0±0.1, indicating the incorporation of a single phenyl group per Cl-PIB-Cl. If chain transfer to monomer would occur, the number of phenyl rings in Cl-PIB-Cl would be less than 1.0, or, in case of ring alkylation it would be larger than 1.0. In either case, the slopes of UV/RI versus $\overline{M}n$ plots would not be unity.

TABLE 1

Synthesis of a Diterminally Halogenated Polyisobutylene using the pDCC/BCl$_3$ System

| Ex. No. | pDCC M × 10$^3$ | Solvent | i-C$_4$H$_8$ M | Temp. °C. | Yield % | Mn g/mole | Inif.Eff. % | Slope UV-MW Corr. |
|---|---|---|---|---|---|---|---|---|
| 1 | 1.0 | CH$_2$Cl$_2$ | 1.0 | −50 | 42 | 21,500 | 100 | 1.0 |
| 2 | 5.0 | CH$_2$Cl$_2$ | 1.0 | −50 | 72 | 5,400 | 130 | .90 |
| 3 | 1.0 | CH$_2$Cl$_2$ | 3.0 | −50 | 34 | 55,000 | 92 | — |
| 4 | 1.0 | CH$_2$Cl$_2$ | 5.0 | −50 | 11 | 100,000 | 30 | — |
| 5 | 1.0 | CH$_2$Cl$_2$ | 1.0 | −30 | 27 | 17,200 | 80 | — |
| 6 | 1.0 | CH$_2$Cl$_2$ | 1.0 | −40 | 35 | 28,000 | 63 | — |
| 7 | 1.0 | CH$_3$CHCl$_2$ | 1.0 | −30 | 24 | 26,000 | 46 | — |
| 8 | 1.0 | CH$_3$CHCl$_2$ | 1.0 | −40 | 39 | 20,200 | 99 | — |
| 9 | 1.0 | CH$_3$CHCl$_2$ | 1.0 | −50 | 39 | 19,100 | 105 | 1.0 |
| 10 | 1.0 | CH$_3$Cl | 1.0 | −70 | 18 | 7,700 | 119 | 1.1 |
| 11 | 2.1 | CH$_3$Cl | 1.0 | −70 | 27 | 7,700 | 90 | 1.0 |
| 12 | 4.2 | CH$_3$Cl | 1.0 | −70 | 32 | 4,200 | 97 | 1.0 |
| 13 | 2.1 | CH$_3$Cl | 1.0 | −50 | 13 | 3,100 | 93 | — |

The effect of pDCC concentration is reported in Table 2 wherein PIB molecular weights are seen to be inversely dependent on pDCC concentration. This effect is undoubtedly due to chain transfer by pDCC. These data also indicate initiation by pDCC. If pDCC would not be an initiator but exclusively a chain transfer agent and initiation were solely due to the presence of unscavengeable impurities, the yield of polymer in the presence and absence of pDCC would be identical. Inasmuch as control experiments conducted in the absence of pDCC produced only insignificant amounts (less than 5%) of polymer, pDCC must have increased the number of kinetic chains, therefore acting, as a bona fide initiator.

TABLE 2

Effect of pDCC concentration on Molecular Weight$^a$

| Ex. No. | i-C$_4$H$_6$ M | pDCC M · 10$^3$ | Solvent | Temp. °C. | Conv. % | Mn g/mole |
|---|---|---|---|---|---|---|
| b | 1.0 | 0 | CH$_3$Cl | −70 | 5 | — |
| 14 | 1.0 | 0.5 | CH$_3$Cl | −70 | 19 | 11,000 |
| 15 | 1.0 | 2.0 | CH$_3$Cl | −70 | 27 | 7,700 |
| 16 | 1.0 | 4.2 | CH$_3$Cl | −70 | 32 | 4,200 |
| 17 | 1.0 | 8.0 | CH$_3$Cl | −70 | 60 | 2,800 |

$^a$Results verified by replication. Reaction times 10 minutes.
$^b$Control

A more detailed analysis of the effect of pDCC concentration on PIB molecular weight provides valuable insight into the mechanism of inifer action. The inifer system under investigation may be described schematically by the following five elementary events:

Ion generation:

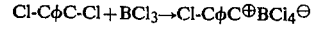

Cationation:

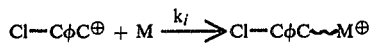

Propagation:

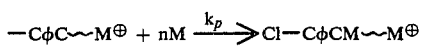

Chain transfer to inifer

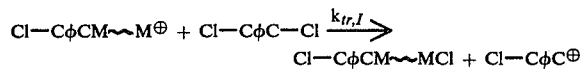

Termination:

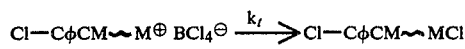

Thus the kinetic degree of polymerization is $$\overline{DP}n = 2k_p[M]/(k_t + k_{tr,I}[I])$$

where I=pDCC inifer; [M]=monomer concentration at any time; and [M]₀=initial monomer concentration. Integrating with respect to [M] and rearranging yields $$([M]_0 - [M])(\ln[M]_0/[M])^{-1}\overline{DP}n^{-1} = \tfrac{1}{2}(k_{tr,I}/k_p)[I] + \tfrac{1}{2}(k_t/k_p)$$

Plotting ([M]₀−[M]) (ln[M]₀/[M])⁻¹/$\overline{DP}$n versus [I] ("inifer plots") should give a straight line whose slope and intercept yield $(\tfrac{1}{2})k_{tr,I}/k_p$ and $(\tfrac{1}{2})k_t/k_p$ respectively. This was found to be true on a separate inifer plot using the data in Table 1 wherein the rate constant of transfer to inifer was ~200 times larger than that of termination. Inasmuch as inifer activity is governed by the term $(k_{tr,I}/k_p)$ [I], termination may become molecular weight controlling at [I]~5×10⁻³ M.

The effect of temperature is next discussed with respect to the data set forth in Table 3. In virtually all cationic polymerizations molecular weights increase with decreasing temperatures irrespective of chain breaking by termination of chain transfer to monomer. In contrast, according to the data presented in Table 3 for methylene chloride and 1,1-dichloroethane, PIB molecular weight obtained by the pDCC/BCl₃ inifer system appears to be virtually independent of temperature, or possibly even decreasing with decreasing temperature. This phenomenon indicates that PIB molecular weights are not determined by termination, and further that the molecular weight controlling event is of lower activation energy than termination or is similar to the activation energy or propagation. Inasmuch as the rate propagation is very fast chain transfer to inifer must also be very rapid.

TABLE 3

Effect of Temperature on Molecular Weight[a]

| Ex. No. | i-C₄H₈ M | pDCC M · 10³ | Solvent | Temp. °C. | Conv. % | $\overline{M}n$ g/mole |
|---|---|---|---|---|---|---|
| 18 | 1.0 | 1.0 | CH₃CHCl₂ | −30 | 24 | 26,000 |
| 19 | 1.0 | 1.0 | CH₃CHCl₂ | −40 | 39 | 20,200 |
| 20 | 1.0 | 1.0 | CH₃CHCl₂ | −50 | 39 | 19,100 |
| 21 | 1.0 | 1.0 | CH₂Cl₂ | −30 | 27 | 17,200 |
| 22 | 1.0 | 1.0 | CH₂Cl₂ | −40 | 35 | 28,000 |
| 23 | 1.0 | 1.0 | CH₂Cl₂ | −50 | 42 | 21,500 |

[a]Results verified by replication. Reaction times 10 minutes.

The effect of solvent polarity is presented in Table 4 and according to the findings therein, decreasing solvent polarity by gradually replacing CH₂Cl₂ with n-pentane and/or chlorobenzene tends to increase PIB molecular weights; however, a trend in yields is difficult to discern. In contrast to these observations, in many conventional carbocationic polymerizations decreasing medium polarity slightly decreases molecular weight while markedly reducing yields. In these systems molecular weights and yields are most likely controlled by the relative rates of chain transfer to monomer and initiation, respectively. In isobutylene polymerizations coinitiated by BCl₃-based systems both molecular weights and yields are controlled by the rate of termination and decreasing medium polarity is expected to reduce both parameters by reducing the ionicity of the ~C⊕(CH₃)₂BCl₄⊖ ion-pair.

In view of these observations it is difficult to explain the data in Table 4 in regard to the effect of solvent polarity. It could be that transfer with inifer is hindered more than propagation by decreasing solvent polarity. Solvent mixtures reported hereinbelow are presented on a volume percent basis unless otherwise specified.

TABLE 4

Effect of Solvent Polarity on Molecular Weight[a]

| Ex. No. | i-C₄H₈ M | pDCC M · 10³ | Solvent v/v | Temp. °C. | Conv. % | $\overline{M}n$ g/mole |
|---|---|---|---|---|---|---|
| 24 | 1.0 | 1.0 | CH₂Cl₂ | −50 | 42 | 2,500 |
| 25 | 1.0 | 1.0 | 77 CH₂Cl₂/ 23 nC₅H₁₂ | −50 | 35 | 31,500 |
| 26 | 1.0 | 1.0 | 77 CH₂Cl₂/ 23 C₆H₅Cl | −50 | 45 | 35,300 |
| 27 | 1.0 | 1.0 | 55 CH₂Cl₂/ 45 C₆H₅Cl | −50 | 63 | 56,500 |
| 28 | 1.0 | 1.0 | 34 CH₂Cl₂/ 66 C₆H₅Cl | −50 | 30 | 51,500 |

[a]Results verified by replication. Reaction times 10 minutes.

Lastly, the effect of isobutylene concentration is presented in Table 5. From the "inifer equation," the monomer concentration to degree of polymerization ratio should remain constant at constant temperature and inifer concentration. Obeyance to the derived relation is shown in Table 5; where $\overline{DP}$n and [M] appear to be linearly proportional.

TABLE 5

Effect of Isobutylene Concentration on Molecular Weight[a]

| Ex. No. | i-C₄H₈ M | pDCC M · 10³ | Solvent | Temp. °C. | Conv. % | $\overline{M}n$ g/mole |
|---|---|---|---|---|---|---|
| 29 | 1.0 | 1.0 | CH₂Cl₂ | −50 | 42 | 21,500 |
| 30 | 2.0 | 1.0 | CH₂Cl₂ | −50 | 50 | 39,000 |
| 31 | 3.0 | 1.0 | CH₂Cl₂ | −50 | 32 | 55,000 |
| 32 | 5.0 | 1.0 | CH₂Cl₂ | −50 | 20 | 100,000 |

[a]Results verified by replication. Reaction times 10 minutes.

Having prepared the difunctional polyisobutylene Cl-PIB-Cl we determined that its telechelic structure could be further verified by the synthesis of a triblock copolymer utilizing a vinyl aromatic monomer. Such a product would additionally be novel and have useful physical properties, particularly with respect to oxidative stability wherein the center elastomeric block (PIB) is saturated versus the unsaturated center block of polydiene containing triblock copolymers.

In the work which follows, we employed the difunctional polyisobutylene Cl-PIB-Cl set forth hereinabove. We anticipated that for useful physical properties in a thermoplastic elastomer the elastomer center block should have a number average molecular weight of from about 40,000 to about 100,000, although usable weights could readily exceed either limit. Preferably the center segment should comprise 40-80% by weight of the resultant thermoplastic elastomer for usefulness although again, other weight amounts could be selected.

As a vinyl aromatic, α-methylstyrene was selected primarily because the Tg of poly(α-methylstyrene) (PαMeSt) is about 70° C. higher than that of polystyrene, adding to the usefulness of the end product. Of course, other vinyl aromatic monomers having from 8 to about 20 carbon atoms could be employed. Number average molecular weight of the PαMeSt block can range from about 4000 to about 200,000.

In order for blocking to occur from the Cl-PIB-Cl center block i.e., formation of block homopolymer segments at the sites of the chlorine termini, it is necessary to employ a suitable Friedel-Crafts acid coinitiator such as $BCl_3$, $SnCl_4$, $TiCl_4$, $SbCl_6$, $FeCl_3$ or an alkylaluminum halide, $R_nAlX_{3-n}$, n is 1 or 2 and in particular, diethylaluminum chloride, which in the presence of the tertiary chlorine from the difunctional PIB can initiate polymerization of α-methylstyrene.

As a solvent for the various polymerizations, we employed methylene chloride to which some chlorobenzene could be added. For purification of the telechelic PIB, n-hexane, n-heptane and/or methylcyclohexane were employed. Polymerization of the vinyl aromatic monomer was conducted at a temperature of from about −30° C. to about −60° C. and for a time of from about 10 minutes to about 2 hours.

Typical laboratory syntheses of the prepolymer (Cl-PIB-Cl) and triblock were carried out in a stainless steel drybox under nitrogen atmosphere. Syntheses were performed in baked-out, stoppered, 300 ml round bottom flasks. The flasks were charged with solvent, monomer and inifer and cooled to the desired temperature by immersion in a constant low temperature bath filled with n-heptane. Reactions were initiated by the addition of precooled solutions of $BCl_3$ in $CH_2Cl_2$. The reactions were terminated by quickly connecting the reactor to a vacuum manifold and flash distilling off volatiles (i.e., isobutylene, $BCl_3$ and $CH_2Cl_2$).

After evaporation of volatiles, the Cl-PIB-Cl was dissolved in a small amount of n-pentane or methylcyclohexane completely to remove entrapped volatiles. The volume of the reaction mixture was determined (graduated cylinder), a small sample was removed for analyses and the remainder of the product transferred to a 300 ml round-bottom flask.

Sufficient $CH_2Cl_2$ was added to the Cl-PIB-Cl prepolymer solution to increase its concentration to at least 40 volume %, a polar medium being necessary to initiate triblocking. The flask was cooled to the desired temperature (−40° C. to −50° C.) and 8–15 ml of αMeSt was added so the charge would contain about 0.6 to 0.8 M of monomer while observing the mixture for signs of inhomogeneity. Where insoluble prepolymer appeared, nonpolar solvent was added until the medium became homogeneous. After thermoequilibration (∼30 minutes) a solution of diethylaluminum chloride in $CH_2Cl_2$ was added to induce blocking. The reaction was stopped by addition of a few ml of methanol. After precipitating into methanol the triblock copolymer was recovered by filtration.

Samples were Soxhlet extracted by using n-pentane (5 days), n-hexane (24 hrs) and n-heptane (3 hrs), and shaking in methylcyclohexane at room temperature.

As gleaned from publications dealing with glassy/rubbery/glassy thermoplastic elastomers prepared by anionic polymerization, satisfactory physical properties for PαMeSt-b-PIB-b-PαMeSt were anticipated with triblocks containing a central PIB sequence of $\overline{M}n=40,000–100,000$ and a minimum of 20% or a maximum of 40% PαMeSt sequences distributed over the two ends of the molecule. Orienting experiments were carried out to develop conditions for the preparation of Cl-PIB-Cl with $\overline{M}n=30,000=100,000$ and to obtain glassy/rubbery compositions in the desired range.

Tables 6 and 7 provide representative results. Table 6 summarizes conditions used to prepare six Cl-PIB-Cl prepolymers (A-F) together with $\overline{M}n$ data while Table 7 describes conditions employed to effect the blocking step.

The designation TB in the experiment column signifies triblock; the letters A-F indicate the particular prepolymer from Table 6 utilized for the corresponding triblock. As discussed hereinabove, prepolymer $\overline{M}n$ can be controlled by judicious selection of temperature, isobutylene and pDCC concentrations, and employing a polar medium.

TABLE 6

| | Synthesis of a Diterminally Halogenated Polyisobutylene | | | | | | |
|---|---|---|---|---|---|---|---|
| Expt. | i-$C_4H_8$ M | pDCC M · $10^3$ | $BCl_3$ M · $10^3$ | Solvent v/v | Temp. °C. | Conv. % | $\overline{M}n$ g/mole |
| A | 1.0 | 1.0 | 4.0 | 75 $CH_2Cl_2$/ 25 chlorobenzene | −50 | 46 | 27,200 |
| B | 2.0 | 1.0 | 4.0 | 50 $CH_2Cl_2$/ 50 chlorobenzene | −50 | 35 | 43,700 |
| C | 3.0 | 1.0 | 4.0 | $CH_2Cl_2$ | −50 | 34 | 55,000 |
| D | 5.0 | 1.0 | 4.0 | $CH_2Cl_2$ | −50 | 11 | 100,000 |
| E | 3.0 | 1.0 | 0.8 | $CH_2Cl_2$ | −50 | 43 | 53,000 |
| F | 3.0 | 1.0 | 1.0 | $CH_2Cl_2$ | −50 | 24 | 54,000 |

Repeatability appeared to be satisfactory as judged by the similar conversions and $\overline{M}n$'s obtained in experiments C, E and F carried out under similar conditions. Again it is noteworthy that [M]/$\overline{DP}n$ remains constant in the various experiments. This phenomenon has been attributed to molecular weight control by inifer and was discussed hereinabove.

Inifer efficiency (I.E.=[pDCC]/[Cl-PIB-Cl]) was close to 100% in most experiments that were carried out under well controlled conditions. In a few experiments I.E. was less than 100%, however, in these instances experimental difficulties could be identified i.e., rapid polymer precipitation during polymerization with possible inifer encapsulation (at [M]=5.0 M) relatively high temperatures (−30° C.) resulting in rapid deprotonation of the cumyl cation prior to attack on isobutylene and relatively low polarity medium, thus inhibiting transfer to inifer. In other instances I.E. was greater than 100% which was attributed to artificially high conversions possibly due to the presence of protogenic impurities.

TABLE 7

Synthesis of poly(α-methylstyrene-b-isobutylene-b-α-methylstyrene)

| Expt. | α-MeSt M | Diethylaluminum Chloride M · $10^2$ | Solvent v/v | Total Vol. ml | Temp. °C. | Time min. | Conv. % | PIB/PαMeSt wt. % |
|---|---|---|---|---|---|---|---|---|
| TB-A | .87 | 1.3 | 57 chlorobenzene/ 22 pentane/ 21 $CH_2Cl_2$ | 264.5 | −42 | 30 | 63 | 25/75 |
| TB-B | .83 | 2.5 | 58 pentane/ 42 $CH_2Cl_2$ | 139.5 | −42 | 30 | 62 | 28/72 |
| TB-C | .66 | 5.0 | 76 methylcyclohexane/ 24 $CH_2Cl_2$ | 69.5 | −50 | 30 | 76 | 50/50 |
| TB-D | .66 | 4.0 | 61 methylcyclohexane/ 39 $CH_2Cl_2$ | 95.8 | −50 | 30 | 85 | 27/73 |
| TB-E | .57 | 3.0 | 68 methylcyclohexane/ 32 $CH_2Cl_2$ | 138.5 | −50 | 60 | 70 | 52/48 |
| TB-F | .68 | 3.0 | 70 methylcyclohexane/ 30 $CH_2Cl_2$ | 151.5 | −50 | 60 | 83 | 44/56 |

With respect to Table 7, repeatability also appeared satisfactory as judged by similar conversion and composition values obtained in experiments TB-C, -E, and -F carried out under similar conditions.

The next phase of the work was to quantize homopolymer contamination of triblocks and to examine compositional distribution by selective solvent extraction and GPC utilizing a series of hydrocarbons with increasing solubilizing power for PIB. The crude product of TB-C containing 50/50 PIB/PαMeSt was selected for the extraction and it was found that the PαMeSt content thereof could be calculated from the relative amount of PαMeSt in the various fractions and their composition.

The value obtained was 0.46 which is in satisfactory agreement with the composition determined directly by NMR spectroscopy, i.e., 0.50, indicating that the amount of homoPαMeSt contamination in the crude product was negligible.

Proof positive for the absence of homopolymer contaminants is agreement between experimental $\overline{M}n$ (by osmometry) of triblock and theoretical $\overline{M}n$ calculated from triblock composition (from NMR spectroscopy) and the $\overline{M}n$ of the PIB center block (ie., $\overline{M}n$ of Cl-PIB-Cl).

Due to difficulties caused by diffusion, osmotic pressure measurements could not be obtained on most copolymers. However, by the use of a less permeable membrane TB-C was analyzed and found to provide reliable data. Thus for TB-C:

Mn, theoretical =

$$\frac{\overline{M}n \text{ of Cl}-\text{PIB}-\text{Cl}}{\text{fraction of PIB in triblock}} = \frac{55,000}{0.50} = 110,000$$

which is in excellent agreement with the experimental (osmotic) $\overline{M}n$ of TB-C=120,000. Close agreement between these data indicates negligible homopolymer contamination in TB-C.

Stress-strain property of a PαMeSt-b-PIB-b-PαMeSt triblock was next determined. A film was cast from the n-pentane-soluble fraction of triblock TB-F; $\overline{M}n$=68,000 (osmometry), composition=88/12 PIB/PαMeSt (wt % by NMR). Thus average triblock microstructure is calculated to be:

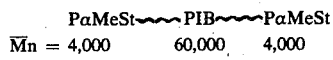

$$\overline{M}n = 4,000 \quad 60,000 \quad 4,000$$

1.5 g of the n-pentane-soluble fraction of TB-F was dissolved in a benzene/n-heptane (50 ml/75 ml) mixture filtered several times, and the solution carefully layered onto the surface of distilled water in a crystallizing dish. The solvent was evaporated (overnight), the film formed on the water surface was first air dried then vacuum dried (<1 mm) for several days, and finally air dried for two months. The film was transparent but optically not entirely clear. It was pliable, snappy but extremely tacky and self-adhering which rendered microdumbell preparation for Instron testing somewhat difficult. Stress-strain tests were carried out by using microdumbells (0.05 mm thick, 0.318 mm wide) stamped from the cast film and an Instron tester at 2.0 cm/min crosshead speed.

Figure 4:
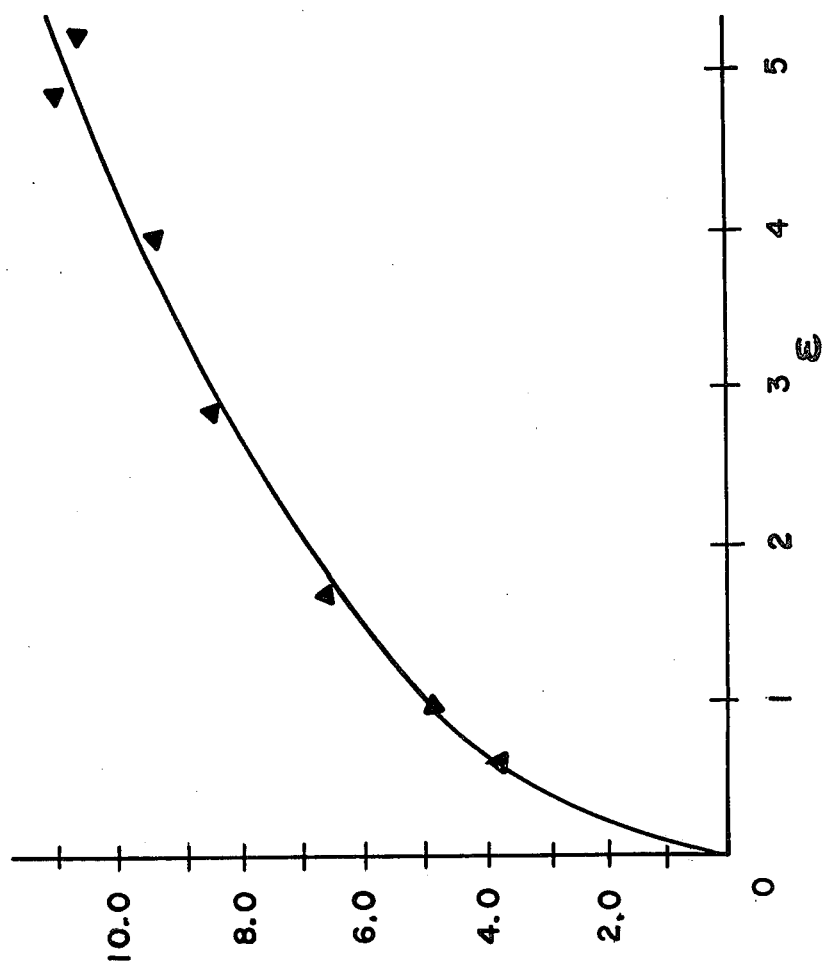

FIG. 4 depicts stress-strain data. These data are remarkably close to those obtained with a carefully prepared poly(styrene-b-butadiene-b-styrene) triblock of similar $\overline{M}n$ and composition (overall $\overline{M}n$=93,000; composition: PBd/PSt=87/13) and narrow molecular weight distribution:

$$\overline{M}n = 6,000 \quad 81,000 \quad 6,000$$

Specifically, tensile strengths and initial moduli of PαMeSt-b-PIB-b-PαMeSt and PSt-b-PBd-b-PSt are virtually identical for both triblocks: 11.0 and 10.5 kg/cm², and 19.0 and 19.2 kg/cm², respectively. Ultimate elongation for the PαMeSt-b-PIB-b-PαMeSt triblock, however, is only 500% whereas that of PSt-b-PBd-b-PSt is 1000%. This difference may be due to the higher concentration of surface defects on the very thin PαMeSt-b-PIB-b-PαMeSt microdumbells used or to the narrower molecular weight distribution of PSt-b-PBd-b-PSt.

As stated hereinabove, by selection of a multifunctional inifer a telechelic multi-armed polymer can be synthesized. To demonstrate the efficacy of the process, we employed 1,3,5-tris(α,α-dimethyl chloromethyl)-benzene or tricumyl chloride TCC, and isobutylene to form a polyisobutylene having three polymer arms each of which was polymerized from the inifer residue and was oppositely terminated with chlorine.

The inifer was prepared by the hydrochlorination of 1,3,5-triisopropenyl benzene. Specifically, 1.0 gm of 1,3,5-triisopropenyl benzene was added to 30.0 gm of $CH_2Cl_2$ and cooled to 0° C. Dry HCl gas was then bubbled into the solution for 2 hours after which, the solvent was removed under vacuum to leave white crystals of the product.

This inifer was then combined with $BCl_3$ as a coinitiator for the polymerization of isobutylene to form a telechelic trihalogenated polyisobutylene tristar as follows:

A master solution of TCC was prepared by dissolving 0.204 gm of the inifer in 25 ml of $CH_2Cl_2$. Five ml of this solution was added to two separate flasks; the first containing 48 ml of isobutylene in 146 ml of $CH_2Cl_2$ and the second containing 56 ml of isobutylene in 132 ml of $CH_2Cl_2$. All solutions were cooled to $-50°$ C. prior to mixing, the order of addition being solvent, isobutylene, inifer and $BCl_3$. From a master solution comprising 1.1 ml $BCl_3$ in 19.1 ml of $CH_2Cl_2$, 2.5 ml was added to each flask and shaken for 15 minutes. Polymerization was thereafter terminated with precooled methanol following which the product was separated and purified. Molecular weight determinations via indicated number average molecular weights of 122,000 for both of the products of the first and second flasks, respectively, referred to hereinbelow as polymer G and polymer H, respectively.

In other samples, we varied the molarity of inifer, isobutylene and $BCl_3$ to yield star polyisobutylene having different molecular weights. Representative data thereof appears in Table 8, wherein molar amounts of monomer, inifer and $BCl_3$ are set forth. Polymerizations were again conducted at $-50°$ C. and in the solvent $CH_2Cl_2$.

TABLE 8

Synthesis of a Triterminally Functional Star Polyisobutylene

| Expt. | i-$C_4H_8$ M | TCC M · $10^3$ | $BCl_3$ M · $10^2$ | Yield % | $\overline{M}n$ | I.E. |
|---|---|---|---|---|---|---|
| G | 2.9 | 0.17 | 5.0 | 60 | 122,000[a] 107,000 | 1.0 |
| H | 3.4 | 0.17 | 5.0 | 40 | 122,000[a] 143,000 | 1.1 |
| I | 3.0 | 70.0 | 10.0 | 100 | 6,000[b] | — |
| J | 3.0 | 5.0 | 5.0 | 100 | 32,000[a] | 1.0 |

[a]Osmometry
[b]by NMR

NMR investigation revealed a shift of aromatic protons from 7.58 to about 7.12 ppm indicating a complete loss of benzylic chlorides and hence, complete initiation.

Having synthesized the telechelic polyisobutylene star, we next sought to enter it into a blocking reaction with α-methylstyrene in the manner described hereinabove with respect to the above-synthesized telechelic polyisobutylene. Suitable number average molecular weights of each block and the composition of the star block copolymer, by weight percent can be about the same as set forth hereinabove with respect to synthesis of the triblock copolymer poly(α-methylstyrene-β-isobutylene-β-α-methylstyrene).

As in the previous blocking work, the prepolymers G and H were first vacuumed to dryness and then each was dissolved in 180 ml of methylcyclohexane and 80 ml of $CH_2Cl_2$. A 2.5 ml amount of α-methylstyrene was next added to each prepolymer solution which was then cooled to $-50°$ C. and shaken for one hour. A solution of diethylaluminum chloride (1 ml) in $CH_2Cl_2$ (20 ml) was prepared, 0.25 ml thereof was added to each flask and polymerization was allowed to continue for 0.15 hour. The polymerization was thereafter terminated with methanol, and the polymers were filtered, redissolved, precipitated and eventually vacuum dried for two days. NMR of the star block copolymer indicated 53 weight percent of α-methylstyrene although separation of homopolymer was not conducted.

Based upon the results of the polyisobutylene synthesis using the inifer tricumyl chloride and subsequent blocking of the prepolymer with α-methylstyrene, it can be concluded that an inifer having multiple functionality can be employed to prepare a telechelic polymer star product of equivalent functionality. Moreover, the syntheses disclosed herein as well as the characterization data establish that a linear block copolymer of α-methylstyrene and isobutylene can be prepared in an orderly fashion with relative ease and that the prepolymer Cl-PIB-Cl can be prepared with great facility by utilizing inifers, particularly p-dicumyl chloride.

It is therefore to be understood that an inifer having the formula $AY_n$, wherein the A component comprises an organic moiety, can be used for the polymerization of isobutylene and certain other cationically polymerizable monomers to yield telechelic star polymers. Synthesis of telechelic polyisobutylenes will enable the subsequent synthesis of other products which heretofore have been unknown. One such novel product involves the dehydrochlorination of Cl-PIB-Cl to yield a diolefin PIB, which can be further synthesized to the dihydroxy species, which products are the subject matter of a copending application U.S. Ser. No. 73,789 commonly owned by the Assignee of record herein. Similarly, utilization of the polyisobutylene tristar will result in the synthesis of trihydroxy terminated polymers. These di- and trihydroxy polyisobutylenes would be useful in polyurethane chemistry. Asymmetric inifers can also be employed to synthesize products having dissimilar termini. Post polymerization reactions therewith will in turn lead to other novel compositions.

Thus it can be seen that the disclosed invention carries out the objects set forth hereinabove. As will be apparent to those skilled in the art, the composition of the telechelic and multifunctional polymers and the block copolymers thereof can be varied within the scope of our total specification disclosure by the selection of the various monomers and inifers as well as the amounts thereof, and it is believed that the preparation and use of these according to the preferred process of the invention can be determined without departing from the spirit of the invention herein disclosed and described, the scope of the invention being limited solely by the scope of the attached claims.

We claim:

1. A process for the synthesis of telechelic halogenated polymers comprising the steps of:
charging a cationically polymerizable olefin monomer having from about 4 to about 12 carbon atoms per molecule and an inifer to a suitable reaction vessel, said inifer charged in a concentration from about $10^{-4}$ to about $10^{-1}$ moles per mole of said polymerizable olefin monomer;
adding a solution of a fully chlorinated metal chloride Friedel-Crafts acid coinitiator in a solvent; and, polymerizing said olefin monomer to form said telechelic halogenated polymer;

said inifer selected from the group consisting of AYn, BZ, and oligomers of α-chlorostyrene having from 2 to 6 units;

where A is selected from the group consisting of condensed and noncondensed aromatic compounds having from 1 to 4 rings, and linear and branched aliphatic compounds having from 3 to 20 carbon atoms;

where Y is represented by the formula:

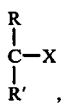

where R and R' are selected from the group consisting of hydrogen, methyl, and phenyl, and R and R' can be the same when A is an aromatic compound, or where R is phenyl when A is an aliphatic compound;

where X is a halogen selected from the group consisting of fluorine, chlorine, and bromine, and where n is an integer from 2 to 6; and where B is selected from hydrocarbons having from 8 to 20 carbon atoms, and where Z is a tertiary halogen selected from the group consisting of tertiary fluorine, tertiary chlorine, or tertiary bromine.

2. A process for the synthesis of a thermoplastic block copolymer comprising the steps of:

charging a cationically polymerizable olefin monomer having from about 4 to about 12 carbon atoms per molecule and an inifer to a suitable reaction vessel said inifer charged in a concentration from about $10^{-4}$ to about $10^{-1}$ moles per mole of said polymerizable olefin monomer;

adding a solution of a Freidel-Crafts acid coninitiator in a solvent;

polymerizing said olefin monomer to form a telechelic halogentated polymer;

thereafter dissolving said telechelic polymer in said solvent;

adding a vinyl aromatic monomer having from 8 to about 20 carbon atoms with mixing and addition of said solvent to form a homogeneous medium;

adding a Friedel-Crafts acid coinitiator in said solvent to induce block polymerization of said vinyl aromatic monomer from said telechelic halogenated polymer to form said block copolymer;

said inifer selected from the group consisting of AYn, BZ, and oligomers of α-chlorostyrene having from 2 to 6 units;

where A is selected from the group consisting of condensed and noncondensed aromatic compounds having from 1 to 4 rings, linear and branched aliphatic compounds having from 3 to 20 carbon atoms;

where Y is represented by the formula:

where R and R' are selected from the group consisting of hydrogen, methyl, and phenyl, and R and R' can be the same when A is an aromatic compound, or where R is phenyl when A is an aliphatic compound;

where X is a halogen selected from the group consisting of fluorine, chlorine, and bromine, and where n is an integer from 2 to 6;

where B is selected from hydrocarbons having from 8 to 20 carbon atoms, and where Z is a tertiary halogen selected from the group consisting of tertiary fluorine, tertiary chlorine, or tertiary bromine.

3. A process, as set forth in claims 1 or 2, wherein said cationically polymerizable monomer is isobutylene.

4. A process as set forth in claim 3, wherein said inifer is a compound of the formula $AY_n$.

5. A process as set forth in claim 4, wherein said inifer is p-dicumyl chloride.

6. A process as set forth in claim 4, wherein said inifer is tricumyl chloride.

7. A process, as set forth in claims 1 or 2, wherein said solvent is selected from the group consisting of methylene chloride, methylcyclohexane, n-pentane and chlorobenzene and mixtures thereof; and the step of polymerizing said olefin monomer is conducted at a temperature of from about $-10°$ C. to about $-78°$ C. and for a period of time of from about 1 to about 60 minutes.

8. A process, as set forth in claim 2, wherein said monovinyl aromatic monomer is α-methylstyrene.

9. A process as set forth in claim 1, wherein said coinitiator is a Friedel-Crafts acid selected from the group consisting of $BCl_3$, $SnCl_4$, $TiCl_4$, $SbCl_6$ and $FeCl_3$.

10. A process, as set forth in claim 9 wherein Friedel-Crafts acid is $BCl_3$.

11. A process, as set forth in claim 2, wherein said coinitiator employed for the step of polymerizing said olefin monomer is selected from the group consisting of $BCl_3$, $SnCl_4$, $TiCl_4$, $SbCl_6$ and $FeCl_3$; and, said coinitiator employed to induce block polymerization is selected from the group consisting of $BCl_3$, $SnCl_4$, $TiCl_4$, $SbCl_6$, $FeCl_3$ and an alkylaluminum compound having the formula $R_nAlX_{3-n}$ wherein R is a simple alkyl of about 1 to 3 carbon atoms, n is 1 or 2 and X is Cl or Br.

12. A process as set forth in claim 11 wherein Friedel-Crafts acid employed for the step of polymerizing said olefin monomer is $BCl_3$ and said Friedel-Crafts acid employed to induce block polymerization is diethylaluminum chloride.

13. A process, as set forth in claims 1 or 2 wherein said telechelic halogenated polymer comprises α,ω-di(t-chloro)polyisobutylene tristar.

14. A process as set forth in claim 2, wherein said thermoplastic elastomer block copolymer comprises poly(α-methylstyrene-β-isobutylene-β-α-methylstyrene).

15. A process as set forth in claims 1 or 2, wherein said telechelic polymer comprises tri(t-chloro)-polyisobutylene tristar.

16. A process as set forth in claim 2, wherein said thermoplastic elastomer block copolymer comprises:

a central elastomer moiety formed from a cationically polymerizable olefin monomer having from about 4 to about 12 carbon atoms, said elastomer moiety having three ends, each said end carrying;

a glassy block polymer moiety formed from a vinyl aromatic monomer having from 8 to about 20 carbon atoms.

17. A novel telechelic polymer formed from an inifer and a cationically polymerizable olefin monomer having from about 4 to about 12 carbon atoms, said polymer having a residue of said inifer in the backbone thereof and carrying at least two tertiary halogen termini;

said inifer selected from the group consisting of $AY_n$, and oligomers of α-chlorostyrene having from 2 to 6 units;

where A is selected from the group consisting of condensed and noncondensed aromatic compounds having from 1 to 4 rings, linear and branched aliphatic compounds having from 3 to 20 carbon atoms;

where Y is represented by the following formula:

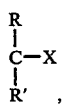

where R and R' are selected from the group consisting of hydrogen, methyl and phenyl, and R and R' can be the same when A is an aromatic compound, or where R or R' is phenyl when A is an aliphatic compound;

where x is a halogen selected from the group consisting of fluorine, chlorine, and bromine, where n is an integer from 2 to 6.

18. A novel telechelic polymer, as set forth in claim 17, comprising:
α,ω-di(t-chloro)polyisobutylene.

19. A novel telechelic polymer, as set forth in claim 17, comprising:
tri(t-chloro)polyisobutylene.

20. A novel telechelic polymer, as set forth in claim 18 wherein the number average molecular weight is from about 1000 to about 100,000.

21. A novel telechelic polymer, as set forth in claim 19, wherein the number average molecular weight is from about 1500 to about 150,000.

22. A novel thermoplastic elastomer block copolymer comprising:
a central elastomer moiety formed from a cationically polymerizable olefin monomer having from about 4 to about 12 carbon atoms, said elastomer moiety having at least two ends, each said end carrying;
a glassy block polymer moiety formed from a vinyl aromatic monomer having from 8 to about 20 carbon atoms.

23. A novel thermoplastic elastomer, as set forth in claim 22, wherein said cationically polymerizable olefin is isobutylene; and,
said vinyl aromatic monomer is α-methylstyrene.

24. A novel thermoplastic elastomer, as set forth in claim 23, wherein the number average molecular weight of each said polyisobutylene moiety is from about 1000 to about 150,000; and,
the number average molecular weight of each said poly-α-methylstyrene block is from about 4000 to about 200,000.

25. A novel thermoplastic elastomer, as set forth in claim 24, wherein the polyisobutylene content of said thermoplastic elastomer ranges from about 40 to about 80 percent by weight, based upon the weight of said elastomer.

UNITED STATES PATENT OFFICE
CERTIFICATE OF CORRECTION

Patent No. 4,276,394   Dated June 30, 1981

Inventor(s) Joseph P. Kennedy, Robert A. Smith, and Louis R. Ross, Jr.

It is certified that error appears in the above-identified patent and that said Letters Patent are hereby corrected as shown below:

Column 23, line 3, delete "AYn" and substitute therefor --$AY_n$--; line 41, delete "halogentated" and substitute therefor --halogenated--.

Column 25, line 29, delete "x" and substitute therefor --X--.

Signed and Sealed this

Third Day of November 1981

[SEAL]

Attest:

GERALD J. MOSSINGHOFF

Attesting Officer    Commissioner of Patents and Trademarks